D. MARSHALL.
TIRE TREAD.
APPLICATION FILED JUNE 21, 1913.
1,082,203.
Patented Dec. 23, 1913.
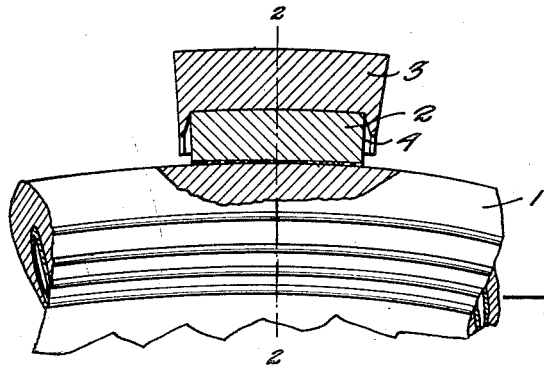
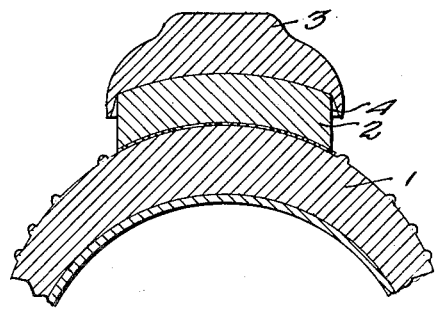
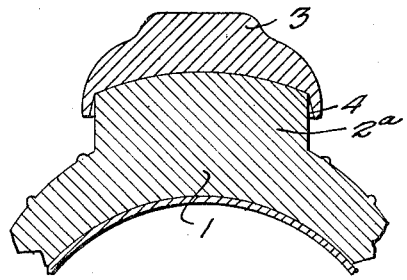
WITNESSES
INVENTOR
Dale Marshall,
his Attorney

UNITED STATES PATENT OFFICE.

DALE MARSHALL, OF CHELTENHAM, ENGLAND.

TIRE-TREAD.

1,082,203.   Specification of Letters Patent.   Patented Dec. 23, 1913.

Application filed June 21, 1913. Serial No. 775,106.

*To all whom it may concern:*

Be it known that I, DALE MARSHALL, a subject of the King of Great Britain, residing at Cheltenham, in the county of Gloucester, England, have invented certain new and useful Improvements in Tire-Treads, of which the following is a specification.

This invention relates to treads for vehicle tires and more particularly to metal or other hard material treads for attachment either permanently or temporarily to pneumatic or other resilient wheel tires, its primary object being to provide against undue friction and wear that inevitably ensues from the differential action generated by the forcible contact with the road of a tread made of metal or other non-resilient material and a resilient tire when the true annular condition of tire is disturbed and furthermore assists in securing the metal tread members to the tire.

With the foregoing and other objects in view, this invention consists in such novel features of construction as will be hereinafter more fully described, illustrated in the accompanying drawings and pointed out by the appended claim.

In describing the invention in detail, reference will be had to the accompanying drawings wherein like characters of reference designate like or corresponding parts throughout the several views, and in which, Figure 1 is a fragmentary view partially in sectional side elevation of a portion of the detachable tread as it would appear on a resilient tire. Fig. 2 is a cross sectional view taken on the line 2—2 of Fig. 1; Fig. 3 is a cross sectional view of a modified form of the tire tread showing the resilient cushioning members formed integral with the periphery of the tire.

Referring to the drawings by numeral, 1 designates a resilient tire which may be of any suitable type now upon the market such as a pneumatic or hard rubber tire which has secured to its outer periphery at definite spaced-apart points laterally resilient cushioning members 2. The laterally resilient cushioning members 2 are secured to the outer periphery of the resilient tire 1 in any suitable manner but in the drawings they are shown cemented thereto or formed integrally with the periphery of the tire. Tread members 3 which are constructed of any suitable hard or non-resilient material such as steel or like material are mounted upon the cushioning members 2 have cut-out portions formed in the lower side of the same in which the laterally resilient cushioning members are seated. The inner side of the cut-out portion 4 which is formed within the tread members 3 engages the upper or outer surface of the cushioning members 2 and is maintained in contact therewith in any suitable manner. The sides of the cut-out portion are formed in such a manner that the portion of the tread member which is adjacent thereto does not contact with the resilient member at any point. This will allow of varying movements of the tread and cushioning members without the same materially wearing either of them.

The cushioning members 2 are provided for reducing the friction and undue wear occasioned by the differential action during the forcible contact between the resilient tire and the treads 3. The laterally resilient cushioning members 2 are preferably mounted about the contour of the tire 1 and will prevent the direct contact of the tire and the tread and their resilient nature will permit of their expansion, contraction, or sagging in any direction or degree in unison with the movement of the resilient tire 1, meanwhile the base and surface thereof which is in contact with the tread members 3 remains immobile and serves as a fulcrum from which the said movement of the resilient means emanate.

Fig. 3 of the drawing shows the laterally resilient cushioning members $2^a$ formed integral with the tire whereby they assist in securing against lateral and longitudinal movement the tread segments to the tire.

In practice, certain minor features of construction may necessitate alterations to which the patentee is entitled, provided such alterations are comprehended within the scope of what is claimed.

What is claimed is:

In a tire tread, a plurality of circumferentially disposed non-resilient tire tread members, laterally resilient cushioning members carried by the tire and interposed between said tread members and the tire, said cushioning members and said tread members having abutting faces of coextensive area and said tread members having flanges disposed circumferentially and transversely of the plane of the wheel and overhanging the sides of said cushioning members in such spaced relation with respect to the sides, when not under load as to permit the expansion of said cushioning members when under compression thereby permitting relative circumferential and radial movement of the tread member on and with respect to the cushioning members.

In testimony whereof I affix my signature in presence of two witnesses.

DALE MARSHALL.

Witnesses:
ELEANOR GIBBINS,
JAMES HENRY BABBAGE.